O. R. WINDERS.
WHEEL.
APPLICATION FILED MAR. 8, 1920.

1,366,619.

Patented Jan. 25, 1921.

INVENTOR:
Oliver R. Winders.
By Frank L. O. Worner,
ATTORNEY.

UNITED STATES PATENT OFFICE.

OLIVER R. WINDERS, OF ANDERSON, INDIANA.

WHEEL.

1,366,619.  Specification of Letters Patent.  Patented Jan. 25, 1921.

Application filed March 8, 1920. Serial No. 364,358.

*To all whom it may concern:*

Be it known that I, OLIVER R. WINDERS, a citizen of the United States, residing at Anderson, in the county of Madison and State of Indiana, have invented certain new and useful Improvements in Wheels, of which the following is a specification.

This invention relates to a vehicle wheel; and one of the objects of the present invention consists in the provision of a wheel in which the use of a pneumatic tire may be dispensed with without destroying its resiliency and easy riding properties.

A further object of the invention consists in the provision of a wheel of the above character, which, in yielding to both side and radial thrust, will resume its normal alinement at all times.

A still further object of the invention consists in providing a wheel of the above character with a semi-floating hub, together with suitable tension devices for applying a tension to normally hold the hub within the transverse axis of the wheel.

I accomplish the above objects of the invention, and such others as may appear from a perusal of the following description and claim, by means of the construction illustrated in the accompanying drawings, forming a part hereof, in which—

Figure 1:
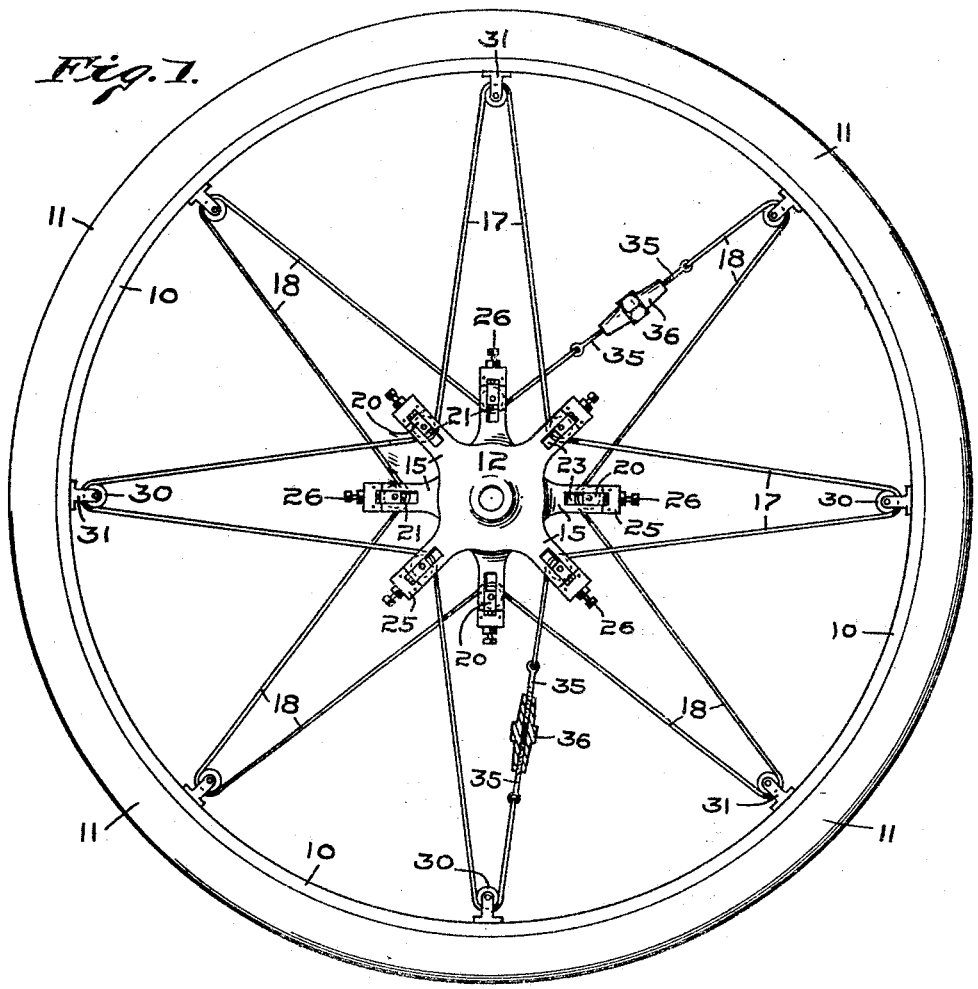
Figure 2:
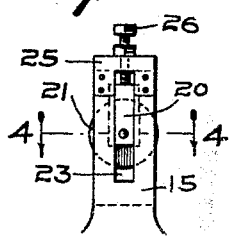
Figure 3:
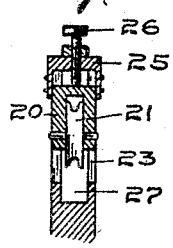
Figure 4:

Figure 1 is a side elevation of my improved vehicle wheel, showing my invention in operative position. Fig. 2 is a fragmentary detail view in side elevation, on an enlarged scale, of one of the adjustable sheaves. Fig. 3 is a central vertical sectional view, on the line 3—3 in Fig. 2. Fig. 4 is a horizontal section, on the line 4—4 in Fig. 2.

Referring to the drawings, 10 represents the felly of the wheel, and 11 a solid tire composed preferably of rubber or similar material. 12 represents a hub which is arranged as usual in the transverse axis of the wheel. Hub 12 is provided at each end with a plurality of uniformly spaced radial arms 15 in which suitable devices are arranged both for stringing and for removing any slack that may arise through the stretching of the wire cables 17 and 18 which form the wheel spokes. The above mentioned devices, as shown in Figs. 2, 3 and 4, comprise sliding journal-boxes 20 for carrying the sheaves 21 over which the wire cables 17 and 18 pass. Radial arms 15 on hub 12 are each provided with a longitudinal slot 23 in which rides one of the journal-boxes 20. These boxes may be moved longitudinally within slots 23 by means of the adjusting-screws 26. The upper ends of slots 23 are closed by the head-plates 25 secured to the ends of arms 15, these headplates providing the means for mounting the adjusting-screws 26. Arms 15 are further provided with the longitudinal slots 27 which extend at right angles to slots 23 and which provide the necessary clearance for the proper working of the sheaves 21.

Arranged along the inner peripheral surface of felly 10 is a series of uniformly spaced sheaves 30 over which wire cables 17 and 18 pass, and these sheaves are retained in suitable brackets 31 secured to felly 10. By means of the foregoing construction and arrangement of parts, wire cable 17 forms one-half of the number of spokes allotted the wheel, and the threading of this cable is effected by passing the cable through every other sheave 30 and alternating therebetween a sheave 21 of the series of sheaves arranged on one end of hub 12. Cable 18 forms the remaining number of spokes allotted the wheel, and this cable is threaded through the series of sheaves 21 on the opposite end of hub 12 and through the sheaves 30 with the method employed in threading cable 17.

The ends of cable wire 17 are secured to the threaded rods 35 and by means of a turn-buckle 36 the initial tension can be applied for drawing the cable taut. Any subsequent adjustments that may be necessary for taking the slack out of cable 17 can be accomplished in a uniform manner through the adjustability of sheaves 21 through the medium of screws 26.

As the method for applying tension to cable wire 18 is the same as described with reference to cable 17, further detailed description thereof is deemed unnecessary.

While I have described my invention with more or less minuteness as regards details of construction and arrangement and as being embodied in certain precise forms, I do not desire to be limited thereto unduly or any more than is pointed out in the claim. On the contrary, I contemplate all proper changes in form, construction and arrangement, the omission of immaterial elements and the substitution of equivalents as circumstances may suggest or necessity render expedient.

I claim:

A vehicle wheel comprising a felly, tire and hub, a plurality of spaced arms arranged around the periphery at each end of the hub, said arms having slots disposed at right angles to each other, sheaves arranged in said slots, sheaves arranged at uniform distances around the wheel-felly, cables forming the wheel-spokes extending back and forth between the sheaves on the hub and wheel-felly, and means for imparting radial movement to the sheaves on the hub for applying a tension to the cables.

In witness whereof, I, have hereunto set my hand and seal at Anderson, Indiana, this first day of March, A. D., one thousand nine hundred and twenty.

OLIVER R. WINDERS. [L. S.]